United States Patent
Woods et al.

[11] 3,986,351
[45] Oct. 19, 1976

[54] METHOD AND APPARATUS FOR CONTROLLING THE AIR FLOW IN AN INTERNAL COMBUSTION ENGINE

[76] Inventors: Robert L. Woods, 10206 Carroll Place, Kensington, Md. 20795; Silas Katz, 12406 Vinton Terrace, Silver Spring, Md. 20906

[22] Filed: Feb. 4, 1975

[21] Appl. No.: 547,069

Related U.S. Application Data

[63] Continuation of Ser. No. 383,355, July 27, 1973, abandoned.

[52] U.S. Cl. .............................. 60/274; 123/90.15; 123/105; 123/119 A; 123/75 E; 60/294
[51] Int. Cl.² .................... F01L 1/34; F01N 1/14
[58] Field of Search ............ 123/90.15, 75 B, 75 E, 123/101, 105, 182, 119 A; 60/274, 294

[56] References Cited
UNITED STATES PATENTS

| | | | |
|---|---|---|---|
| 1,614,709 | 1/1927 | Baoter | 123/119 A |
| 1,623,589 | 4/1927 | Granath | 123/182 |
| 2,292,233 | 8/1942 | Lysholm | 123/75 E |
| 2,344,993 | 3/1944 | Lysholm | 123/105 |
| 2,817,322 | 12/1957 | Miller | 123/75 E |
| 2,887,993 | 5/1959 | Shallenberg | 123/75 E |
| 3,416,502 | 12/1968 | Weiss | 123/75 E |
| 3,441,009 | 4/1969 | Ratanelli | 123/90.15 |
| 3,625,189 | 12/1971 | Myers | 123/119 A |

*Primary Examiner*—Wendell E. Burns
*Assistant Examiner*—David D. Reynolds
*Attorney, Agent, or Firm*—Nathan Edelberg; Robert P. Gibson; Saul Elbaum

[57] ABSTRACT

A method and apparatus for controlling the air flow in an internal-combustion engine that comprises an unthrottled variable-timing third valve engine modification. An unthrottled full charge of air is drawn into the cylinders during the standard intake stroke of a four-stroke internal-combustion engine. During the initial portion of the succeeding compression stroke, a portion of that full charge is discharged through a third valve. Thus, the same mass of air that would result from throttled engine remains in the cylinders to be compressed. This air quantity is adjusted by means of adjusting the timing of the opening and closing of the third valve in accordance with the power requirements of the engine. A full charge of air is utilized for a full load, while a lesser charge is utilized for a partial load. Power losses which result from conventional intake air throttling are thereby eliminated.

3 Claims, 12 Drawing Figures

MAXIMUM POWER

PARTIAL LOAD POWER

FIG.4a  MINIMUM LOAD

FIG.5a  MEDIUM LOAD

FIG.6a  MAXIMUM LOAD

METHOD AND APPARATUS FOR CONTROLLING THE AIR FLOW IN AN INTERNAL COMBUSTION ENGINE

RIGHTS OF GOVERNMENT

The invention described herein may be manufactured, used and licensed by or for the Government of the United States for governmental purposes without the payment to us of any royalty thereon.

CROSS REFERENCE TO RELATED APPLICATIONS

This application is a Continuation of Ser. No. 383,355 filed July 27, 1973, and now abandoned.

BACKGROUND OF THE INVENTION

1. Field of the Invention

This invention relates to internal-combustion engines and, more particularly, to a unique and novel modification of an internal-conbustion engine for controlling the air flow and consumption within the cylinders thereof.

2. Description of the Prior Art

Extensive effort is being directed towards investigation of fluidic fuel management systems with a concern for lower emissions and improved economy in internal-combustion engines. Work we have done has led to the conclusion that only modest improvement in the exhaust emissions could result from better carburetion. Therefore, significant improvements in emissions could not result from changes in three basic areas: fuel composition, exhaust gas treatment or engine design. At present, with the large emphasis on pollution control, all three areas are being investigated extensively.

With the foregoing in mind, engine designs and modifications were considered which would improve economy and emission. The most promising proposal appeared to be the variable displacement engine, since most have one operating point for peak efficiency which generally occurs at about half power with low engine speed. However, by varying the displacement of the engine, the maximum power output can be varied. Thus, the displacement of the engine could be selected in a continuously variable manner to produce the required load power at the engines's most efficient operating point. In effect, a "small" engine could be utilized for low power operations, and a "large" engine could be utilized for high power operation by merely controlling the displacement in accordance with the power demands.

Prior art attempts at implementing the foregoing concept have generally been both complicated and unsuccessful. For example, a variable displacement axial piston pump had been proposed by Welch in a final report No. 10713 to TACOM Propulsion Systems Laboratory, Warren, Mich. entitled: "Investigation of the Feasibility of a Variable Displacement Engine." It was found in the foregoing report that the variable displacement was achieved by adjusting the wobble plate angle and, therefore, the effective stroke. This concept, while apparently feasible, required a radical redesign of the engine, and was therefore unacceptable from a practical point of view.

SUMMARY OF THE INVENTION

It is therefore a primary object of the present invention to provide a variable displacement engine of simple design which can be easily incorporated into a standard-combustion engine design.

Another object of the present invention is to provide a method and apparatus for controlling the air flow in an internal-combustion engine so as to achieve a variable displacement effect while eliminating conventional intake air throttling.

A further object of the present invention is to provide a simple and uncomplicated modification to an internal combustion engine which results in lower emissions and improved economy.

The foregoing and other objects are obtained in accordance with one aspect of the present invention through the provision of a novel and unique method for controlling the air flow in a standard four-stroke internal-combustion engine. A full charge of unthrottled air is drawn into the cylinders during the standard intake stroke. A variable-timed third valve is included which is open during portions of the intake and compression strokes for admitting air into the cylinder during the portion of the intake stroke and exhausting a portion of the full charge of air during a portion of the compression stroke. Thus, the same mass of air that would result from a throttled engine remains in the cylinders to be compressed after the third valve closes. This quantity of air remaining in the cylinders is adjusted in accordance with the power requirements of the engine. The remaining portion of the four stroke cycle coincides with those of a conventional internal-combustion engine. Apparatus for implementing the third valve having a constant duration and variable timing also disclosed.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which:

FIGS. 4(a) and 4(b) are respectively the timing chart and associated pressure-volume curve for the operation of the present invention with a minimum load;

FIGS. 5(a) and 5(b) are respectively a timing chart and associated pressure-volume diagram for the device of the present invention with a medium load;

FIGS. 6(a) and 6(b) are respectively a timing chart and its associated pressure-volume diagram for the third valve engine modification of the present invention operating at a maximum load.

DETAILED DESCRIPTION OF A PREFERRED EMBODIMENT

Figure 1:
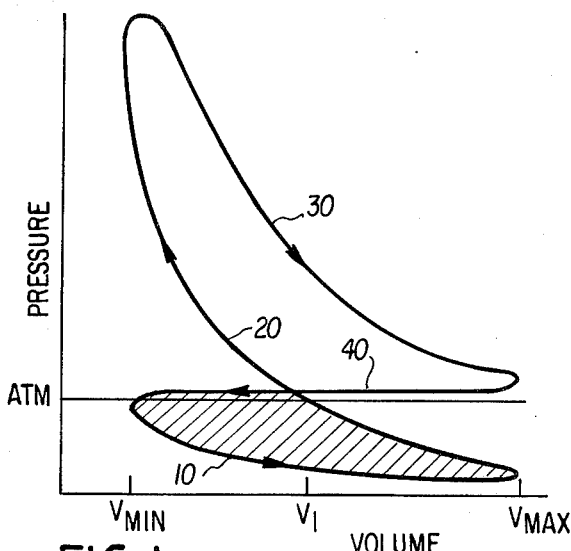
FIG. 1 is a graph representing the pressure-volume characteristics of typical prior art conventional engine operating at partial load.

In a conventional four-stroke internal-combustion engine, the air consumption is controlled by throttling the intake air which results in an undesirable power loss. This can be more clearly understood with reference to FIG. 1 which illustrates a pressure-volume diagram for a conventional four-stroke internal-combustion engine operating with a partial load. The portion 10 of the curve in FIG. 1 represents the intake stroke wherein the intake valve admits throttled air into the cylinder. The throttling process reduces the pressure in the cylinder and thus reduces the air density. The result is that a certain mass of air is contained in the cylinder at maximum volume ($V_{max}$). This mass is then compressed during the compression stroke represented by the portion 20 of the curve of FIG. 1. This mass is included in a volume $V_1$ at atmospheric pressure. In accordance with normal operations, towards the end of the compression stroke represented by portion 20 of the curve, ignition occurs with a subsequent steep rise in pressure. The ignited fuel and air mixture then forces the cylinder back towards a position of maximum volume during the expansion or power stroke represented by portion 30 of the curve of FIG. 1. At maximum volume, the exhaust valve is opened and the combusted air-fuel mixture is exhausted as represented by the portion 40 of the curve. The hatched area within the enclosed curve of FIG. 1 represents a pumping work loss incurred by this process due to the resistance created by the throttling of the intake air. This power loss becomes more significant at low throttling and less significant during open or full throttling (maximum load).

Figure 2:
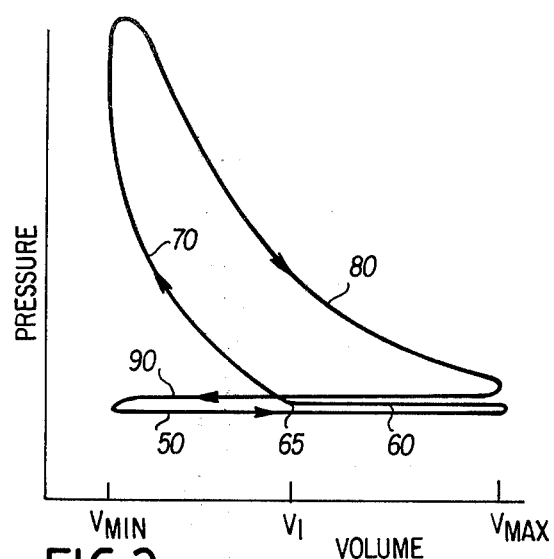
FIG. 2 is characteristic pressure-volume curve of an internal-combustion engine with the third valve modification according to the present invention.

In the third valve engine of the present invention there is no intake air throttling as occurs with conventional engines. Thus, the power loss which occurs due to this throttling is eliminated. In the process of the present invention, a full charge of air is drawn into the cylinders and some portion of that charge is discharged through a third valve. Thus, the same mass of air that would result from the aforementioned throttled engine remains in the cylinders to be compressed during the compression stroke. This air quantity is adjusted in accordance with the power requirements of the engine. A full charge of air is used for a full load and lesser charge for a partial load. Thus, the air comsumption, or the amount of air actually used in each cycle, will be determined by the amount of air discharged. This occurs in contradistinction to the intake air throttling of conventional internal-combustion engines as described hereinabove. FIG. 2 illustrates the advantages of the foregoing operation in illustrating a pressure-volume characteristic curve for the third valve engine operating at a partial load. During the intake stroke, represented by the portion 50 of the curve of FIG. 2, air is drawn in without restriction to obtain a full charge of air just slightly below atmospheric pressure. As the volume approaches $V_{max}$ the third valve is opened and remains open during the initial portion of the compression stroke so as to discharge a portion of the full charge of air. The third valve timing is varied so that it closes at such a time so as to enclose a volume $V_1$ at atmospheric pressure, represented by point 65 of the curve of FIG. 2. The remainder of the process is identical to that of a conventional engine as represented by the compression stroke 70, the expansion stroke 80, and the exhaust stroke 90. However, if air and fuel were mixed during the intake stroke, part of the fuel mixture would be discharged during that time in which the third valve were open. Thus, fuel must be injected directly into the combustion chamber after the third valve closes. It is seen by a comparison of the characteristic curves of FIGS. 1 and 2 that the third valve engine modification according to the present invention eliminates the power loss which is due to intake air throttling of prior art engines.

Figure 3:
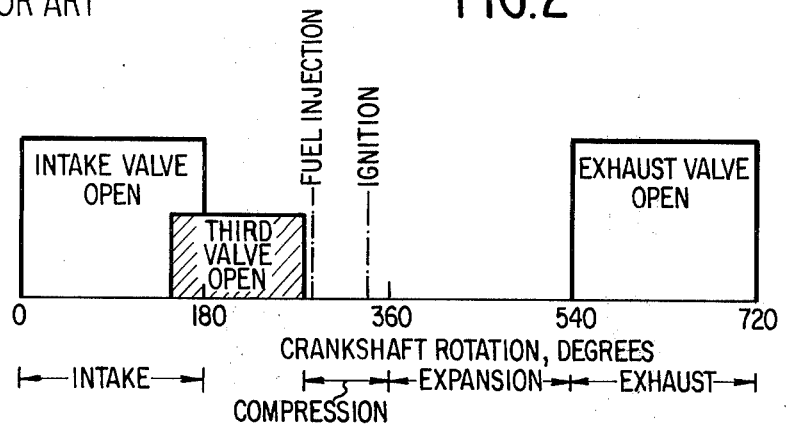
FIG. 3 is a schematic representation of the timing sequence of the third valve engine modification of the present invention.

Referring now to FIG. 3, the timing sequence for the third valve engine of the present invention is illustrated. The intake and exhaust valve operation is the same as that for a conventional internal-combustion engine. The modification consists of including the third valve with variable timing and early or late fuel injection. The third valve is seen to be open during the latter portion of the intake stroke and remains open during the initial portion of the compression stroke, the actual timing of which is dependent upon the load conditions. A low pressure fuel injector could be utilized for the early fuel injection which follows immediately after the third valve closes. A high pressure injection system could achieve charge stratification when late fuel injection is utilized.

Figure 4B:
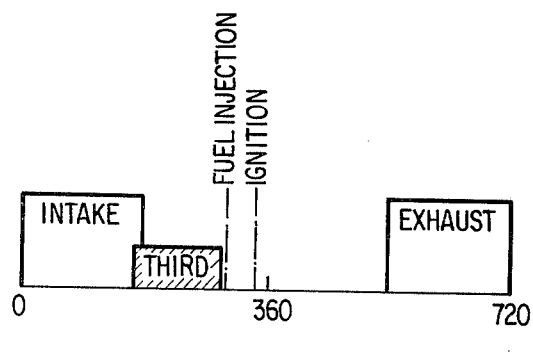
Figure 4B:
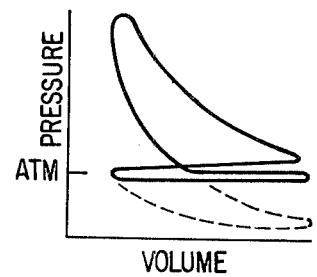
Figure 5B:
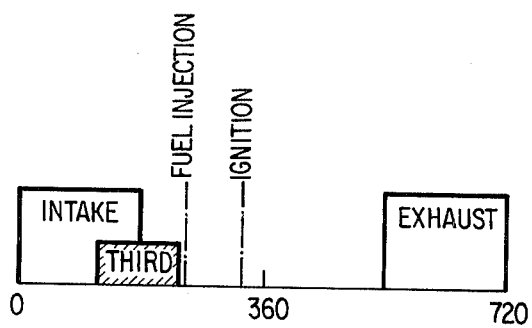
Figure 5B:
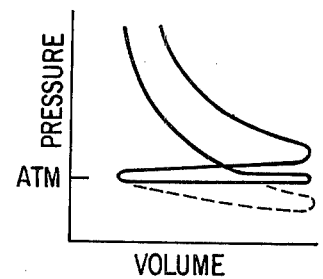
Figure 6B:
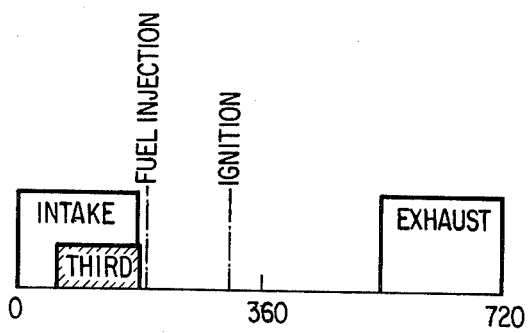
Figure 6B:
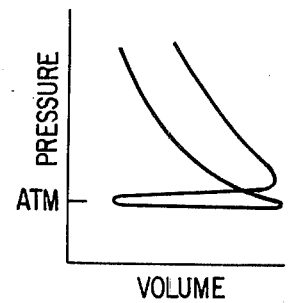

The third valve of the present invention is preferably opened for a constant duration and has variable timing. The duration and timing characteristics require that the opening of the third valve overlaps the opening of the intake valve. The overlap is maximum at high load, as depicted by FIG. 6(a), and is minimum at low loads, as depicted by FIG. 4(a). FIG. 5(a) represents a timing chart for the operation of the third valve with a medium load. It is seen from a comparison of the characteristic curves of a minimum, medium and maximum load, as represented in FIGS. 4(a), 5(b), and 6(b), respectively, that the maximum benefit of the present invention occurs at a minimum load, whereas the effect of the present invention at maximum load would be most nearly equal with the standard operation of a throttled internal-combustion engine. The dotted portions of the curves of FIGS. 4(b) and 5(b) represent the portion of power loss which is avoided during minimum loads, respectively, by the device of the present invention.

Figure 9:
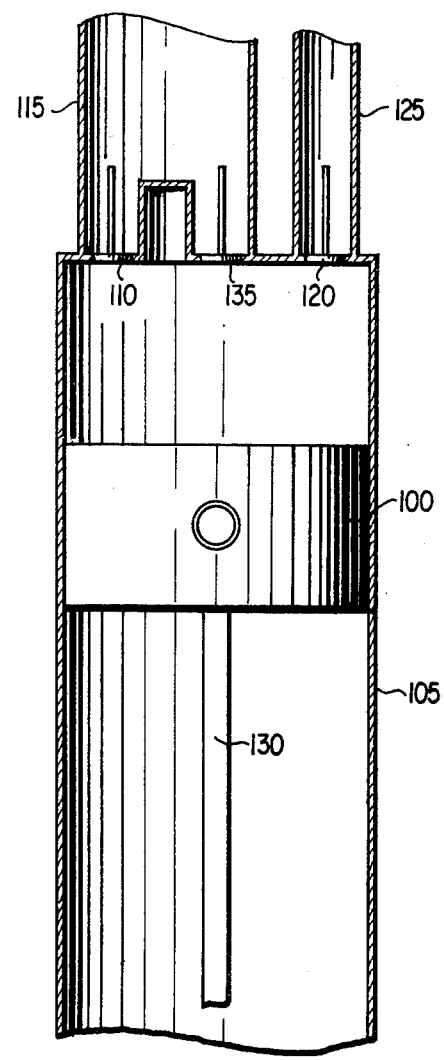
FIG. 9 illustrates a conventional piston-cylinder arrangement provided with a third valve in accordance with the present invention.

The third valve can be manifolded to discharge the excess air into the exhaust gases, which has two beneficial effects with respect to pollution. First, the discharge air could contain residual emissions from the previous cycle. Secondly, the addition of oxygen into the hot exhaust gases promotes further reaction (oxidation) of the undesirable exhaust emissions and thereby further reduces emissions. Since the third valve is manifolded to the exhaust manifold, the possibility for exhaust gas recirculation (EGR) is inherent. The percent EGR would be maximum at high loads and would be less at lower loads. This is shown in FIG. 9 which illustrates a conventional piston-cylinder arrangement for an internal combustion engine comprising piston 100 slidably disposed within cylinder 105 which includes intake valve 120 supplied through port 125 and exhaust valve 110 which discharges through port 115. Connecting arm 130 connects piston 100 in a conventional manner to the crankshaft to be driven. In accordance with the present invention, third valve 135 discharges into exhaust port 115.

Figure 7:
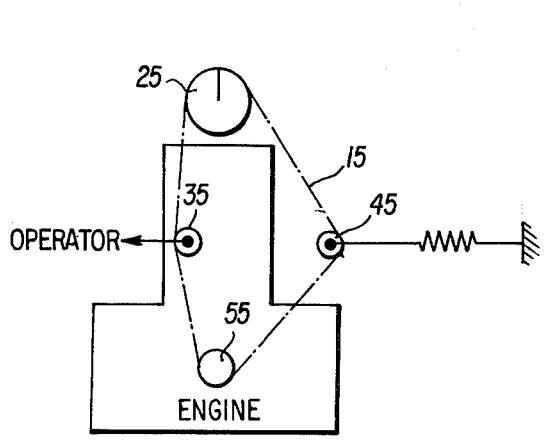
FIGS. 7 and 8 are schematic representations of apparatus for mechanizing the variable timing for the third valve internal combustion engine modification of the present invention.
Figure 8:
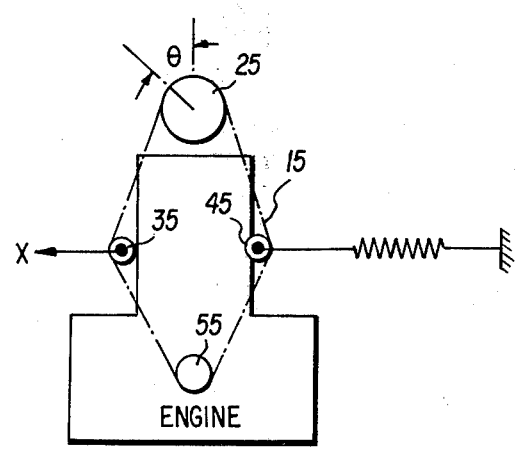

The constant duration, variable timing third valve of the present invention can be mechanized by the apparatus depicted in FIG. 7. A chain 15 engages a third valve camshaft 25, a timing idler 35, and the crankshaft of the engine 55. Chain 15 drives the third valve camshaft 25 by a 2:1 reduction from the camshaft 55. Chain 15 is sized to be much longer than normal. The slack is taken up by a spring loaded idler 45. The relative timing between the crankshaft 55 and the third valve camshaft 25 can be advanced by displacing the timing idler 35 (under the control of the operator) to the left as shown in FIG. 8. The timing advance effect can be best visualized by considering crankshaft 55 to be held at a certain position. If timing idler 35 is displaced in the direction X, a counterclockwise rotation of the third valve camshaft 25 through an angle $\theta$ results. This will result in an advanced or earlier closing of the third valve. In this manner, the constant duration third valve can be timed under the control of the operator of the engine in accordance with the required power and load conditions.

It is seen that we have provided an unique and novel modification to an internal-combustion engine that allows reduced emissions and improved fuel economy. By utilizing the third valve of the present invention, the negative work for part load operation of prior art internal-combustion engines has been eliminated. In addition, the present invention offers improvements in emissions and economy in that the mass of air can be precisely controlled in each cylinder such that the prior art cylinder-to-cylinder variations in fuel/air mixtures is also reduced.

We wish it to be understood that we do not desire to be limited to the exact details of the construction shown and described, for obvious modifications can be made by persons skilled in the art.

What is claimed as new and desired to be secured by Letters Patent of the United States is:

1. Apparatus for controlling the air flow in a four-stroke internal-combustion engine, wherein said four strokes sequentially comprise an intake, compression, expansion, and exhaust stroke, which comprises:
   a piston movably disposed over a non-variable distance to a constant height within a cylinder during said four strokes;
   an intake valve for admitting unthrottled air into said cylinder during said intake stroke;
   an exhaust valve for discharging the contents of said cylinder as exhaust gases during said exhaust stroke;
   means for exhausting a portion of said unthrottled air from said cylinder during a portion of said compression stroke which comprises a third valve which is open for a constant duration regardless of engine load during the latter portion of said intake and during the initial portion of said compression stroke;
   means for adjusting said portion of said intake and compression strokes during which said third valve is open according to the loading conditions of said engine; and
   means for discharging said portion of air into said exhaust gases.

2. The apparatus according to claim 1, wherein said adjusting means comprises:
   a third valve camshaft for controlling the opening and closing of said third valve;
   a timing idler that is displaceable under the control of the operator of said engine;
   a chain which engages said third valve camshaft, said timing idler and crankshaft of said engine; and
   a spring loaded idler also engaged by said chain for taking up the slack thereof.

3. In a four-stroke internal-combustion engine having a piston movably disposed within a cylinder an intake valve for supplying intake gases, an exhaust valve for discharging exhaust gases into an exhaust port, and a third valve connected to the exhaust port, a method of minimizing pollution comprising:
   drawing into the cylinder through the intake valve during the intake stroke;
   drawing exhaust gases into the cylinder through the third valve during a small portion of the intake stroke if the engine is at minimum load;
   drawing exhaust gases into the cylinder through the third valve during a medium portion of the intake stroke if the engine is at medium load;
   drawing exhaust gases into the cylinder through the third valve during a large portion of the intake stroke if the engine is at maximum load;
   discharging exhaust gases through the third valve during a large portion of the compression stroke if the engine is at minimum load;
   discharging exhaust gases through the third valve during a medium portion of the compressing stroke if the engine is at medium load;
   discharging exhaust gases through the third valve during a small portion of the compression stroke if the engine is at maximum load.

* * * * *